US012711603B2

(12) United States Patent
Jain et al.

(10) Patent No.: US 12,711,603 B2
(45) Date of Patent: Aug. 18, 2026

(54) DISTORTION PREDICTION FOR ADDITIVE MANUFACTURING USING IMAGE ANALYSIS

(71) Applicants: Jayesh Rameshlal Jain, The Woodlands, TX (US); Gunarajan Chaudhry, Bangalore (IN); Chad Yates, Houston, TX (US)

(72) Inventors: Jayesh Rameshlal Jain, The Woodlands, TX (US); Gunarajan Chaudhry, Bangalore (IN); Chad Yates, Houston, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 389 days.

(21) Appl. No.: 17/727,362

(22) Filed: Apr. 22, 2022

(65) Prior Publication Data

US 2023/0342908 A1 Oct. 26, 2023

(51) Int. Cl.
*B33Y 50/02* (2015.01)
*G05B 13/02* (2006.01)
*G06T 7/00* (2017.01)

(52) U.S. Cl.
CPC .............. *G06T 7/001* (2013.01); *B33Y 50/02* (2014.12); *G05B 13/027* (2013.01); (Continued)

(58) Field of Classification Search
CPC ........... G06T 7/001; G06T 2207/30108; G06T 2207/20081; G06T 2207/20084; B33Y 50/02; G05B 13/027
See application file for complete search history.

(56) References Cited

U.S. PATENT DOCUMENTS

2019/0070787 A1* 3/2019 Higgs, III .............. B33Y 50/02
2020/0276764 A1 9/2020 Mccarthy et al.
(Continued)

FOREIGN PATENT DOCUMENTS

WO 2022060472 A2 3/2022
WO WO-2022194960 A1 * 9/2022 .............. B22F 12/90

OTHER PUBLICATIONS

International Search Report and Written Opinion, Mailed: Aug. 4, 2023, Application No. PCT/US2023/019418, filed Apr. 21, 2023, 10 pages.

*Primary Examiner* — Sumati Lefkowitz
*Assistant Examiner* — Michael Adam Shariff
(74) *Attorney, Agent, or Firm* — CANTOR COLBURN LLP

(57) ABSTRACT

Examples described herein provide a method that includes performing an image analysis on an image of a layer of an object being manufactured by an additive manufacturing system to identify an exposed surface in the image of the layer. The method further includes performing a build simulation to generate a simulated distortion for the layer. The method further includes evaluating build data to determining a value of an influencing factor for the layer. The method further includes predicting at least one of a predicted distortion or a predicted re-coater interference for a next layer, using a machine learning model, based at least in part on the image analysis, the build simulation, and the build data. The method further includes implementing an action, based at least in part on the at least one of the predicted distortion or the predicted re-coater interference, to alter fabrication of the next layer.

16 Claims, 12 Drawing Sheets
(5 of 12 Drawing Sheet(s) Filed in Color)

(c) Recoater interference

(52) U.S. Cl.
CPC ............... *G06T 2207/20081* (2013.01); *G06T 2207/20084* (2013.01); *G06T 2207/30108* (2013.01)

(56) References Cited

U.S. PATENT DOCUMENTS

| | | | | |
|---|---|---|---|---|
| 2021/0387421 | A1* | 12/2021 | Putman | B22F 10/20 |
| 2022/0063199 | A1 | 3/2022 | Jain et al. | |
| 2023/0234137 | A1* | 7/2023 | Reutzel | B22F 12/90<br>382/141 |
| 2024/0142941 | A1* | 5/2024 | Mehr | B22F 10/00 |

* cited by examiner (d) Streak, no interference (c) Recoater interference

DISTORTION PREDICTION FOR ADDITIVE MANUFACTURING USING IMAGE ANALYSIS

BACKGROUND

Embodiments described herein relate generally to additive manufacturing and more particularly to techniques for distortion prediction for additive manufacturing using image analysis.

Additive manufacturing in the process by which a three-dimensional object is generated by depositing materials successively to layers. Various industries utilize additive manufacturing to generate objects. Such industries can include aerospace, automotive, consumer goods, medical devices, oil and gas exploration and production, and the like. Downhole exploration and production efforts involve the deployment of a variety of sensors and tools into the earth to locate and extract hydrocarbons. Additive manufacturing can be useful to create components of tools, or entire tools, used in downhole exploration and production efforts.

SUMMARY

Embodiments of the present invention are directed to distortion prediction for additive manufacturing using image analysis.

A non-limiting example method includes performing an image analysis on an image of a layer of an object being manufactured by an additive manufacturing system to identify an exposed surface in the image of the layer. The method further includes performing a build simulation to generate a simulated distortion for the layer. The method further includes evaluating build data to determining a value of an influencing factor for the layer. The method further includes predicting at least one of a predicted distortion or a predicted re-coater interference for a next layer, using a machine learning model, based at least in part on the image analysis, the build simulation, and the build data. The method further includes implementing an action, based at least in part on the at least one of the predicted distortion or the predicted re-coater interference, to alter fabrication of the next layer.

A non-limiting example system includes a processing system includes a memory and a processor, the processing system for executing the computer readable instructions, the computer readable instructions controlling the processing device to perform operations. The operations include performing an image analysis on an image of a layer of an object being manufactured by an additive manufacturing system to identify an exposed surface in the image of the layer. The operations further include performing a build simulation to generate a simulated distortion for the layer. The operations further include comparing the exposed surface in the image of the layer with the simulated distortion for the layer. The operations further include predicting distortion for a next layer using a machine learning model. The operations further include implementing an action, based at least in part on the predicted distortion, to reduce distortion during fabrication of the next layer.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Referring now to the drawings wherein like elements are numbered alike in the several figures.

DETAILED DESCRIPTION

Additive manufacturing (sometimes referred to as "3D printing") includes various manufacturing techniques (modalities) that allow "growing" an object from feedstock (e.g., powder, wire, filament, etc.) layer-by-layer into a desired shape rather than removing material from bar stock as in non-additive (i.e., subtractive) manufacturing approaches. The main advantages of additive manufacturing are relative simplicity of the manufacturing process (e.g., less steps, most of the process is happening within a single machine, no operator running the machine, etc.) and freedom of design (i.e., complex shapes can be created).

During additive manufacturing, distortion (also referred to herein as "deformation") can occur. Distortion is a deflection of a part from a desired shape. Distortions lead to dimensional inaccuracy and even re-coater inference, which can cause quality issues and/or failed builds. Conventionally, distortions are not prevented by simulations alone during design.

Accordingly, one or more embodiments are described herein for distortion prediction for additive manufacturing using image analysis. According to one or more embodiments described herein, a method is provided for training a machine learning model (e.g., a recurrent neural network) to predict how distortions effect a next layer of a build. Particularly, the machine learning model, once trained, can be used to perform real-time (or near-real-time) distortion prediction using image analysis. By predicting distortions, additive manufacturing technologies can be improved by reducing or eliminating distortions. According to one or more embodiments described herein, a method is provided that uses pre-built simulation results in conjunction with real-time (or near-real-time) image analysis in a trained machine learning model (e.g., a recurrent neural network) to estimate actual distortion in a current layer and predict a distortion in a next layer. In some examples, the predictions can be used to infer re-coated interference and/or dimensional accuracy. According to one or more embodiments described herein, process parameters for an additive manufacturing system can be controlled to reduce distortion, such as by reducing laser power on distorted regions, skipping a layer in selected regions, and/or the like, including combinations thereof.

Figure 1:
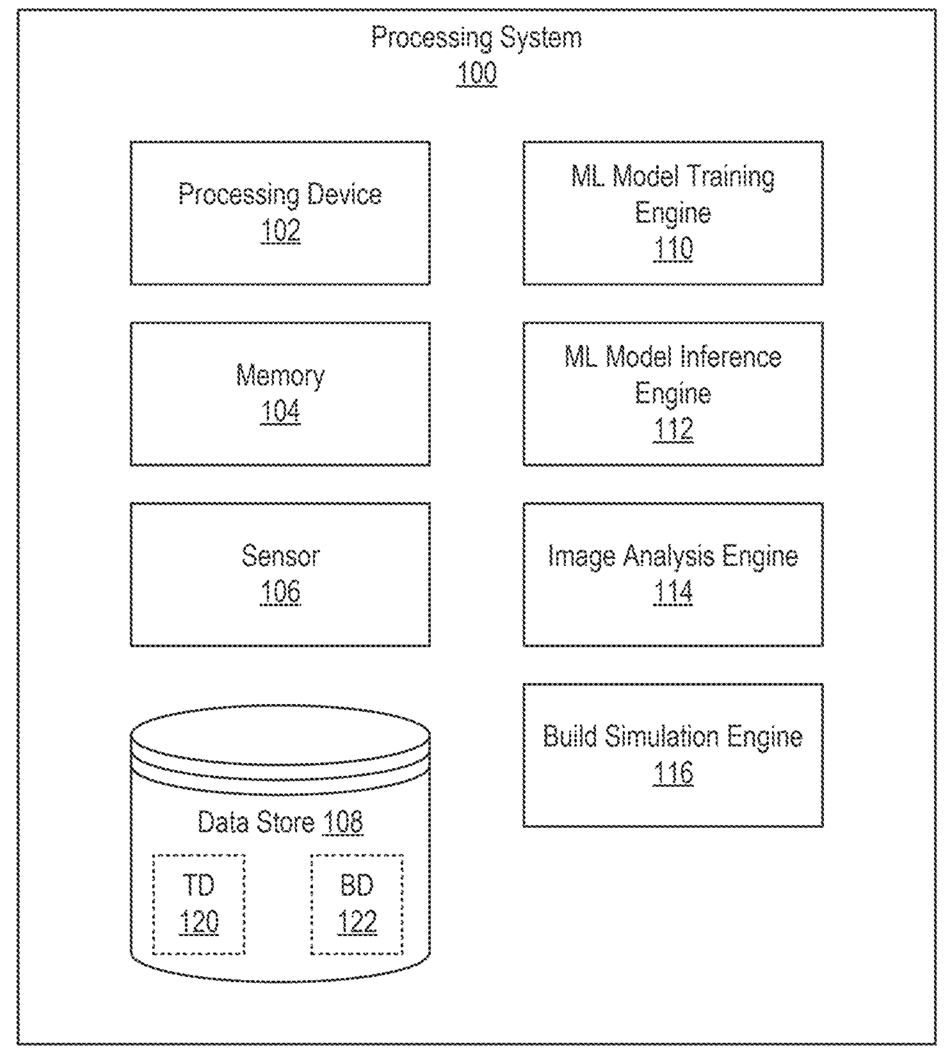
FIG. 1 depicts a block diagram of a system for distortion prediction for additive manufacturing using image analysis according to one or more embodiments described herein.

FIG. 1 depicts a block diagram of a processing system 100 for distortion prediction for additive manufacturing using image analysis according to one or more embodiments described herein. The processing system 100 includes a processing device 102, a memory 104, a sensor 106, a data store 108, a machine learning (ML) model training engine 110, a ML model inference engine 112, an image analysis engine 114, and/or a build simulation engine 116. Other configurations of the processing system 100 are possible such that one or more of the components, engines, etc. can be removed and/or one or more additional components, engines, etc. can be added.

The various components, engines, etc. described regarding FIG. 1 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 102 for executing those instructions. Thus a system memory (e.g., memory 104) can store program instructions that when executed by the processing device 102 implement the engines described herein. Other engines can also be utilized to include other features and functionality described in other examples herein.

The processing device 102 can be any suitable processing device (or "processor") or multiple such devices. Examples of processing devices include microprocessors, microcontrollers, central processing units (CPUs), graphics processing units (GPUs), reduced instruction set computer (RISC) microprocessors, and/or the like, including combinations and/or multiples thereof. The processing device 102 can be coupled to a system memory (e.g., the memory 104). Examples of the system memory, such as the memory 104, include read-only memory (ROM), random access memory (RAM), and/or the like, including combinations and/or multiples thereof. The sensor 106 can be any suitable device or combination of devices to collect data. For example, the sensor 106 can be a camera, a temperature sensor, a vibration sensor, an optical sensor, and/or the like, including combinations and/or multiples thereof. The data store 108 can be any suitable storage device or combination of devices to store data, such as data collected by the sensor 106. For example, the data store 108 can be a hard disk drive, a solid state disk, and/or the like, including combinations and/or multiples thereof.

The processing system 100 (using, for example, the processing device 102, the memory 104, the sensor 106, and/or the data store 108) can implement machine learning model training and inference, image analysis, and/or build simulation using one or more of the ML model training engine 110, the ML model inference engine 112, the image analysis engine 114, and/or the build simulation engine 116.

Additionally, a cloud computing system can be in wired or wireless electronic communication with one or all of the elements of the processing system 100. Cloud computing can supplement, support or replace some or all of the functionality of the elements of the processing system 100. Additionally, some or all of the functionality of the elements (e.g., the engines 110, 112, 114, 116) of the processing system 100 can be implemented as a node of a cloud computing system. For example, the ML model training engine 110 be implemented in a cloud computing system such that training of the ML model is performed in the cloud computing system. The model can then be transferred to or otherwise made available to the processing system 100, such as via a network.

As described herein, a machine learning model can be trained to perform real-time (or near-real-time) distortion prediction for additive manufacturing, which is useful for improving the additive manufacturing process. More specifically, the present techniques can incorporate and utilize rule-based decision making and artificial intelligence (AI) reasoning to accomplish the various operations described herein, namely distortion prediction for additive manufacturing. The phrase "machine learning" broadly describes a function of electronic systems that learn from data. A machine learning system, engine, or module can include a trainable machine learning algorithm that can be trained, such as in an external cloud environment, to learn functional relationships between inputs and outputs that are currently unknown, and the resulting model can be used for performing segmentation of CT voxel data. In one or more embodiments, machine learning functionality can be implemented using an artificial neural network (ANN) having the capability to be trained to perform a currently unknown function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANN that are particularly useful at analyzing visual imagery. Recurrent neural networks (RNN) are a class of artificial neural networks that operate on sequential or time series data. RNNs are trained using training data. RNNs learn from previous inputs using a feedback loop, which acts as a "memory" for storing states or information of a previous input used to generate a next output. Examples of types of architectures for RNNs include long short term memory (LSTM), bidirectional RNN, or gated recurrent units.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was read. It should be appreciated that these same techniques can be applied in the case of real-time (or near-real-time) distortion prediction for additive manufacturing.

The ML model training engine 110 trains a machine learning model, such as a recurrent neural network, using training data 120 stored in the data store 108 or another suitable device. The ML model inference engine 112 uses the trained ML model to make predictions about distortion. The inference can be supplemented with one or more of image analysis performed by the image analysis engine 114 and/or build simulations performed by the build simulation engine 116.

Using the engines 110, 112, 114, 116, the processing system 100 predicts distortion for additive manufacturing using image analysis. An embodiment is described as follows. For example, the processing system 100 performs pre-build simulations to generate simulated distortions. The processing system 100 also performs image analysis on camera images to detect real distortions on a layer (e.g., exposed regions and interferences). The simulated distortions and results of the image analysis are applied to a trained machine learning model (e.g., a recurrent neural network) to estimate distortion in a current layer and predict expected distortions in a next layer. This provides for estimating dimensional inaccuracy and/or predicting re-coater interference in real-time (or near-real-time), which provides for taking corrective actions, such as alter laser parameters or paths and/or skipping a next layer(s) in select regions to minimize distortion. Additional examples of corrective actions include using a larger layer thickness to avoid interference, increasing a time interval between subsequent layers to let the part cool down, not printing that part further but continue to print other parts on the plate, continue as-is, stopping and abandoning the build, and/or the like, including combinations and/or multiples thereof. In some cases, an operator of the additive manufacturing system can be notified, and they can implement a suitable action. Further, results can be used to improve designs and/or build setups for future fabrication. In some examples, the results can be used to retrain the machine learning model. It should be appreciated that one or more other embodiments are also possible. The features and functionality of the engines 110, 112, 114, 116 are now described in more detail with reference to FIGS. 2-8.

Figure 2:
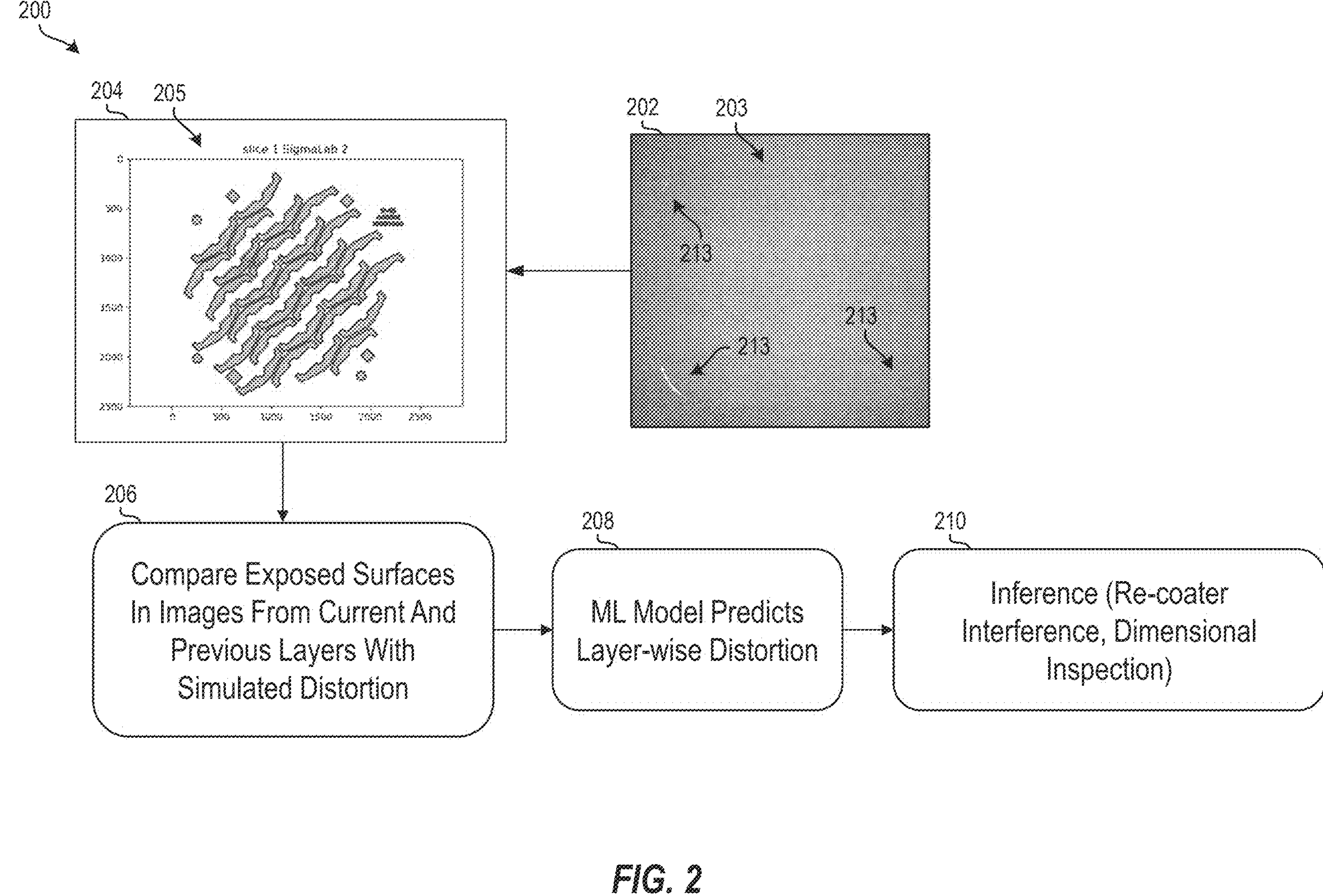
FIG. 2 depicts a flow diagram of a method for distortion prediction for additive manufacturing using image analysis according to one or more embodiments described herein.

FIG. 2 depicts a flow diagram of a method 200 for distortion prediction for additive manufacturing using image analysis according to one or more embodiments described herein. The method 200 can be implemented using any suitable system and/or device. For example, the method 200 can be implemented using the processing system 100 of FIG. 1, the processing system 900 of FIG. 9, and/or the like, including combinations and/or multiples thereof.

At block 202, an image 203 is received or captured (such as by the sensor 106). The image 203 is an image of a layer of an object being fabricated by an additive manufacturing system. The image is taken of a fixed z-height relative to a build volume of the additive manufacturing system At block 204, a slice overlay 205 is generated. The slice overlay represents build instructions for fabricating the layer (corresponding to the image 203) by the additive manufacturing system.

At block 206, the processing system 100, using the image analysis engine 114, performs image analysis on the image 203. Particularly, the image analysis engine 114 performs an image analysis on the image 203 to identify an exposed surface 213 in the image 203 of the layer. The exposed surfaces represent areas of a layer where material has been removed or otherwise disturbed, which may have been caused, for example, by a re-coater. The exposed surfaces in the image 203 from the current layer (and/or from previous layers) are then compared with a simulated distortion generated by the build simulation engine 116. That is, the build simulation engine 116 generates a simulated distortion for the layer (or layers) as further described herein, and the simulated distortion is compared to the results of the image analysis.

At block 208, a trained machine learning model is applied to results of the comparison at block 206 to predict distortion for a next layer. At block 210, inference is performed (e.g., re-coater inference, dimensional inspection, etc., including combinations and/or multiples thereof).

Additional processes also may be included, and it should be understood that the processes depicted in FIG. 2 represent illustrations, and that other processes may be added or existing processes may be removed, modified, or rearranged without departing from the scope of the present disclosure.

Turning now to FIGS. 3A-3F, image analysis is now described. For example, images 301-306 are shown for image analysis using the image analysis engine 114 according to one or more embodiments described herein. Particularly, FIGS. 3A-3D depicts images 301-304 of layers of an object being manufactured by an additive manufacturing system according to one or more embodiments described herein. The images 301-304 show post-recoating images taken during the build for four different layers: layers 395, 445, 566, and 791 respectively. These layers are merely used as examples, and the techniques described herein can be applied to any layers and/or any number of layers. At layer 395 (image 301), an exposed region 311 of the part is not covered by the powder after recoating due to out of plane deformation (e.g., curling or uplift) and is exposed. This is observed as a bright or shiny object in the image 301. The exposed region 311 grows as curling grows through layer 566 (image 302), when the deformed part collides with the re-coater blade, known as interference, and causes improper spreading characterized by a streak 312 (images 303, 304). The interference continues for additional layers and eventually goes away as curling reduces. A streak is still visible because the re-coater blade is damaged by this point and cannot spread the powder properly. Any other type of image (e.g. thermal) could be used according to one or more embodiments described herein.

Figures 3A, 3B:
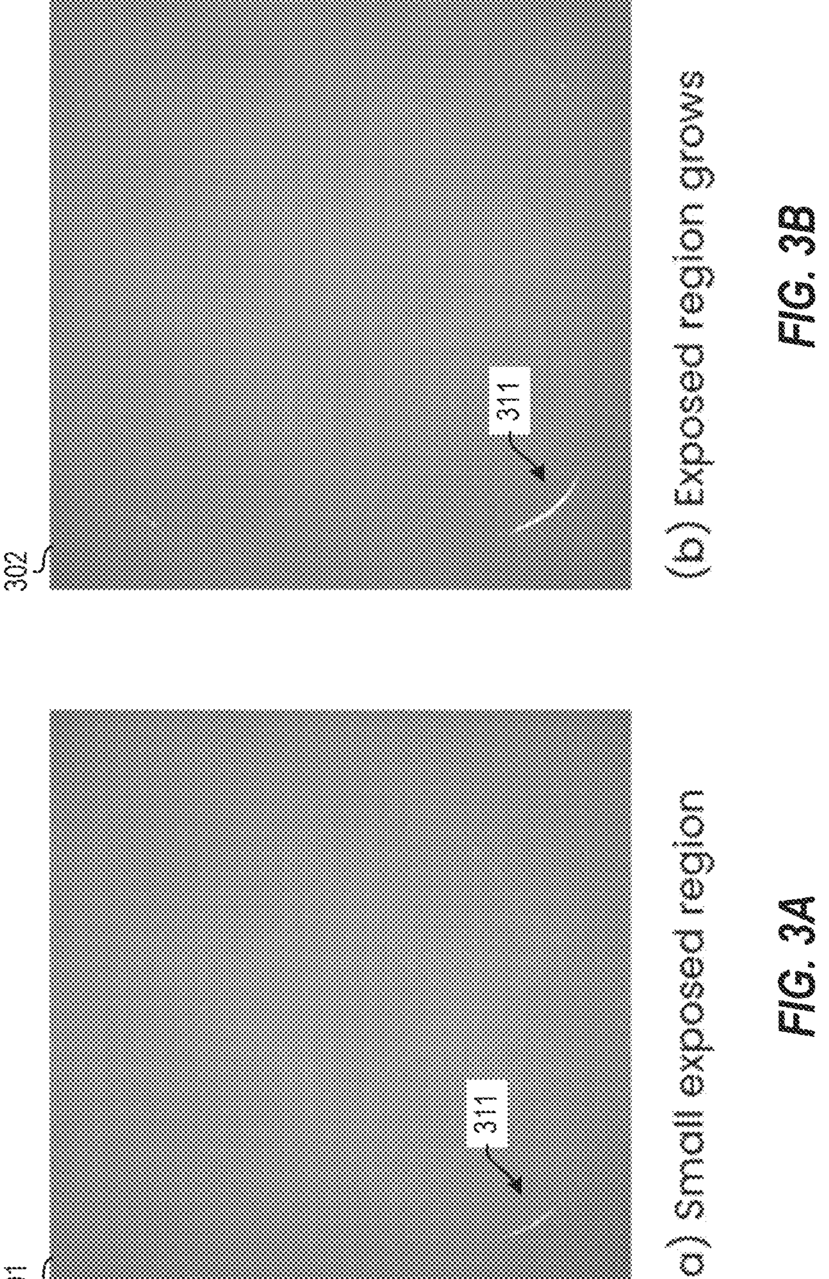
FIGS. 3A-3D depicts images of layers of an object being manufactured by an additive manufacturing system according to one or more embodiments described herein.
Figure 3D:
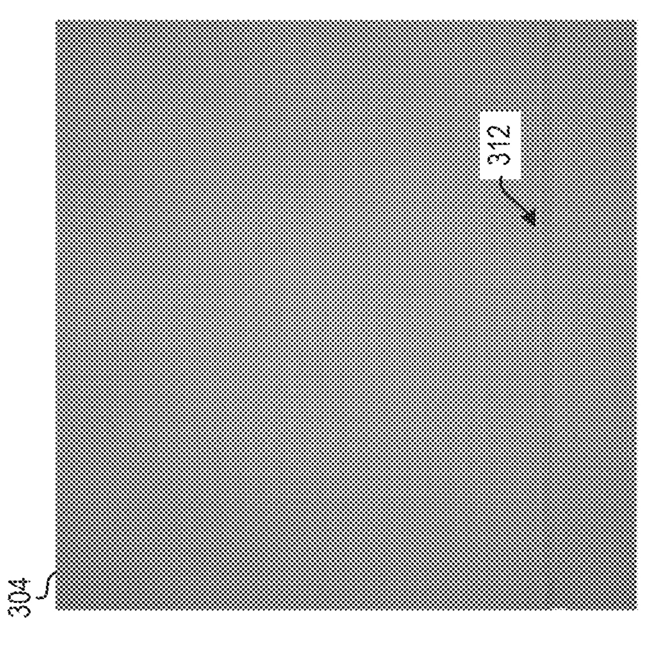
Figure 3C:
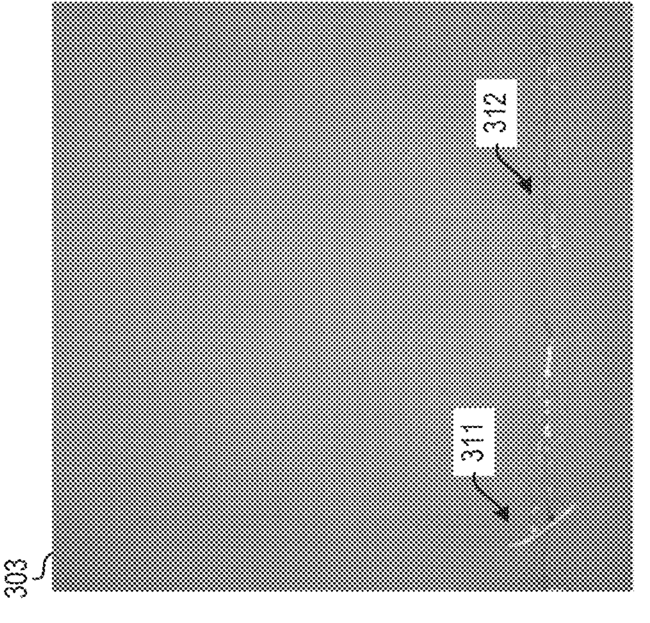
Figures 3E, 3F:
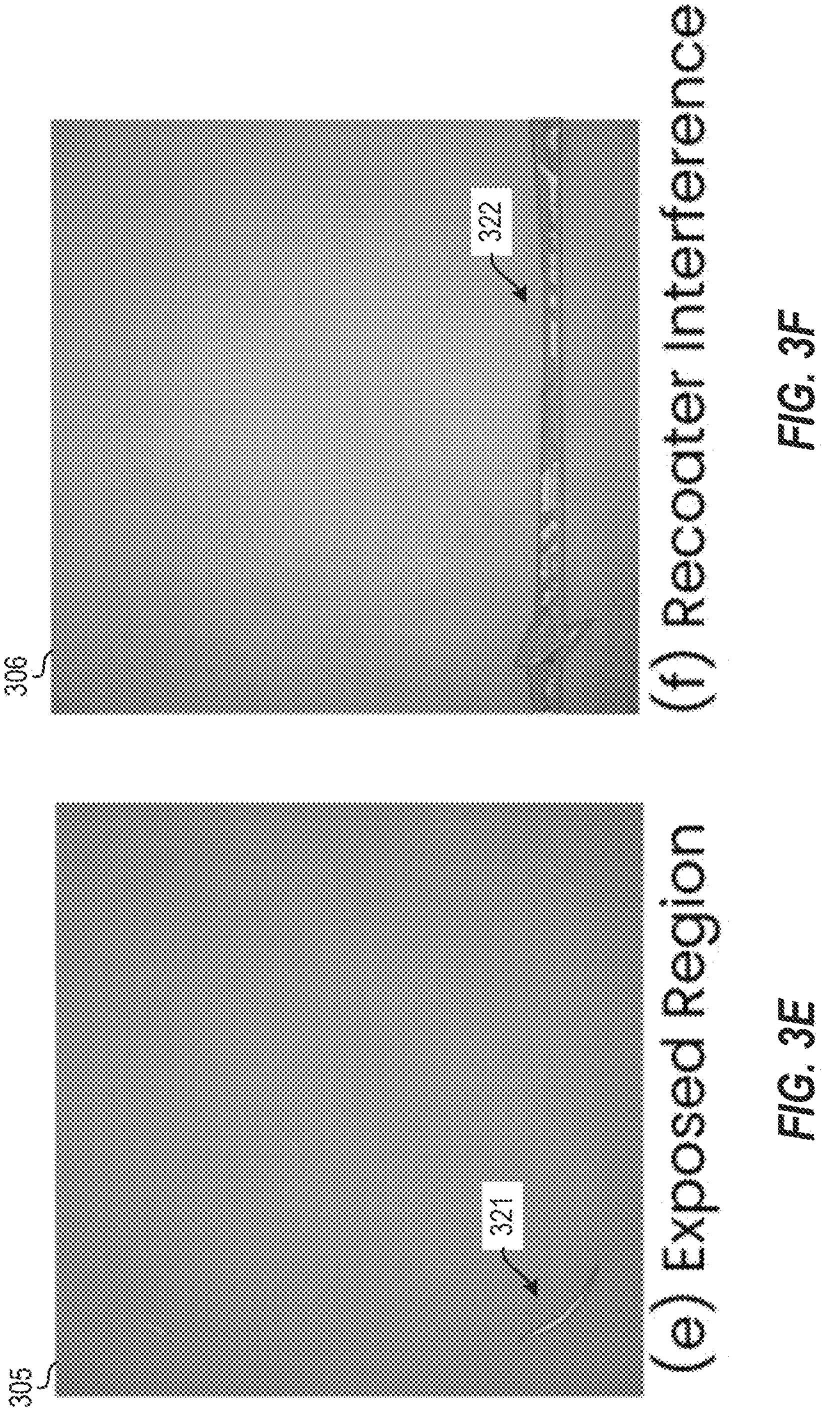
FIG. 3E depicts an image of an exposed region according to one or more embodiments described herein.
FIG. 3F depicts an image of a streak caused by re-coater interference, according to one or more embodiments described herein.
Figures 4A, 4B:
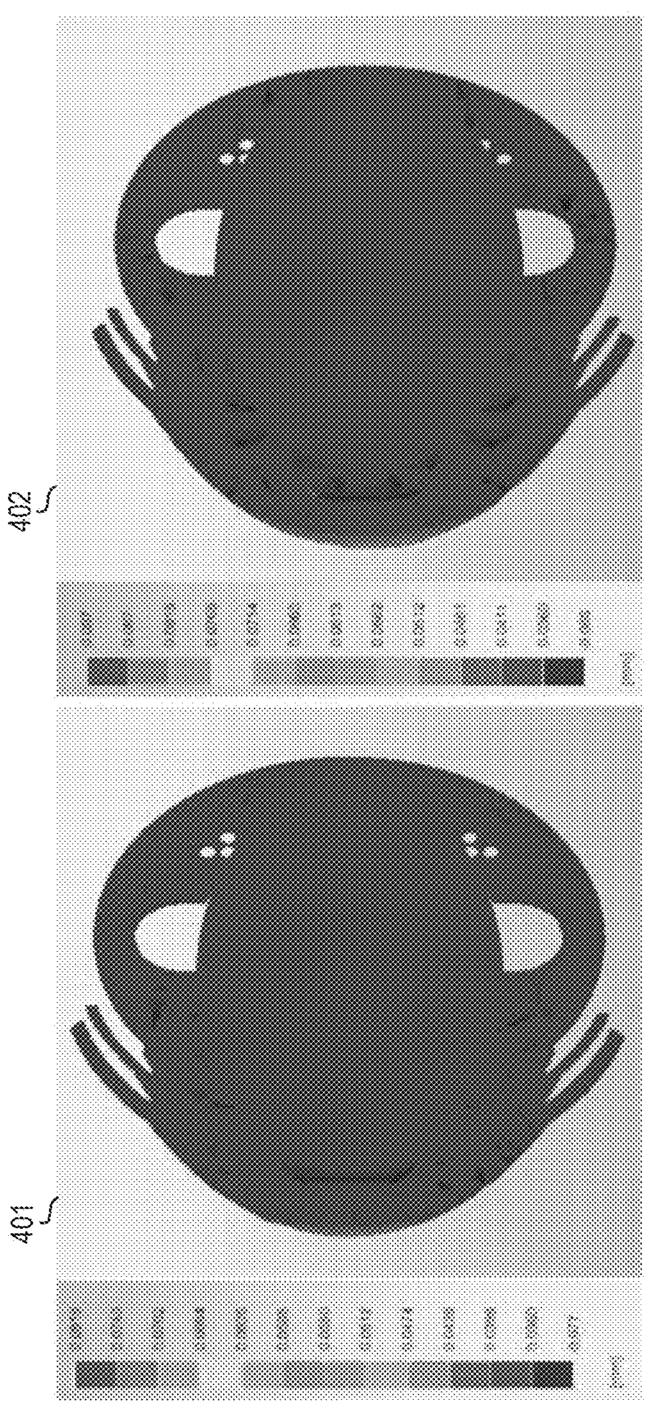
FIGS. 4A-4D depict images of simulated deformations predicted by simulation according to one or more embodiments described herein.
Figures 4C, 4D:
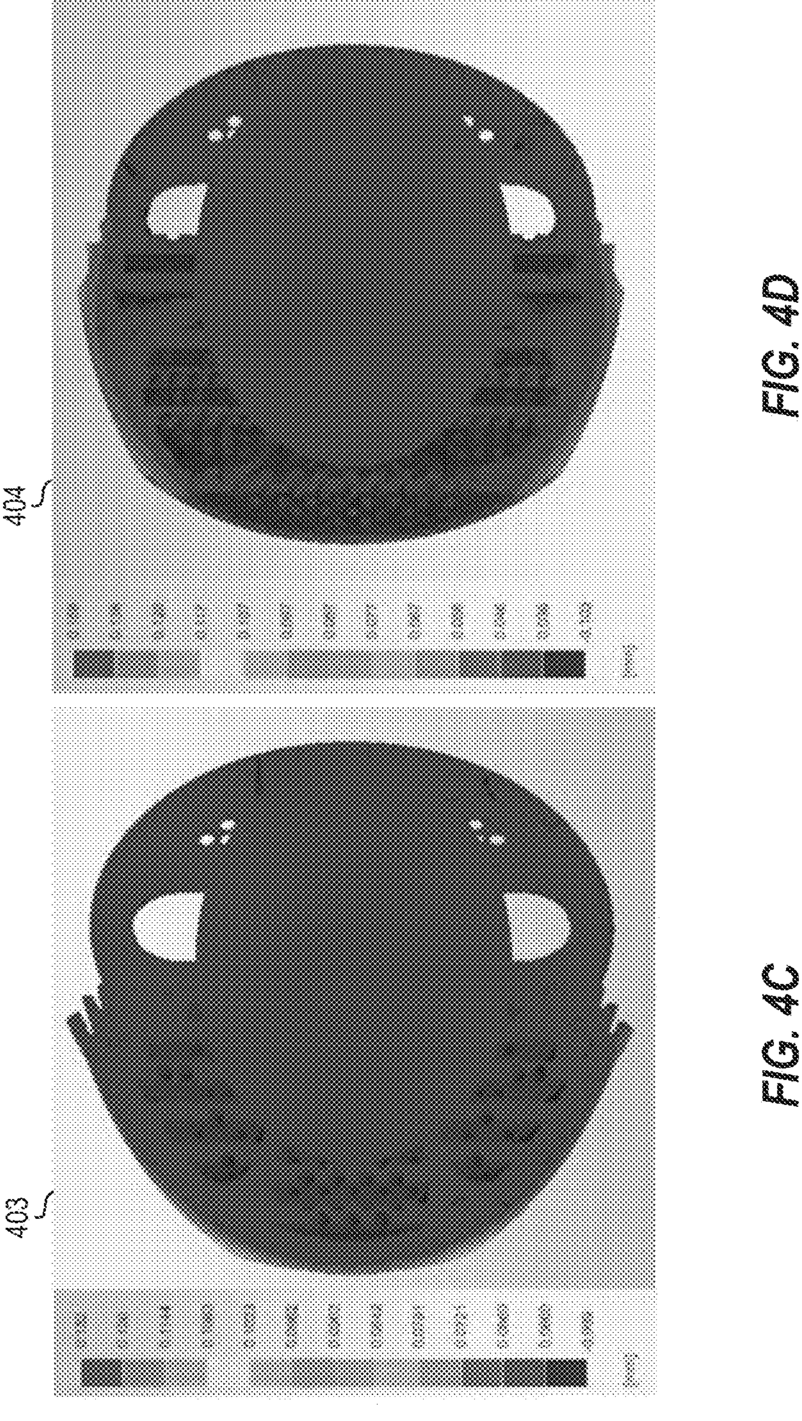

The processing system 100 uses the image analysis engine 114 to perform image analysis on the images 301-304. Such image analysis can include, for example, image processing, computer vision algorithms, etc. including combinations and/or multiples thereof. The image analysis can be used to detect exposed regions, streaks, and/or re-coater interferences and the like from the post-recoating image in real-time (or near-real-time). The images 305 and 306 show detected regions 321, 322 corresponding to the exposed region 311 and the streak 312 of the images 301-304, which the processing system 100 identifies using computer vision segmentation models, for example. Particularly, FIG. 3E depicts an image 305 of an exposed region 321, and FIG. 3F depicts an image 306 of a streak 322 caused by re-coater interference, according to one or more embodiments described herein.

Turning now to FIGS. 4A-4D, build simulation is now described. For example, images 401-404 show simulated deformations for layers 395, 445, 566, and 791 respectively (see, e.g., FIGS. 3A-3D). The images 401-404 are layer-wise deformations predicted by simulation. The processing system 100, using the build simulation engine 116, predicts the deformations shown in images 401-404. The build simulation engine 116 performs physics-based simulations of the build process. The color contours of FIGS. 4A-4D show out of plane deformation (curling). Re-coater interference is predicted when the predicted curling exceeds a certain threshold depending on the powder layer thickness, for example. The simulations can consider one or more of planned material type, processing parameters, and/or the like, but in at least one example, do not necessarily account for all phenomena, unknown physics, and/or actual conditions during build which could be different than what was planned/intended. Therefore, the actual deformation and interference may not always agree with predictions.

Build data can also be used during distortion prediction. For example, the processing system 100 can store, such as in the data store 108, build data (BD) 122. For example, a large number of factors such as the feedstock material (powder), design, build setup, chamber conditions, processing parameters, and/or the like including combinations thereof, could affect deformation during the build (i.e., fabrication). Build simulations may not account for all these factors. Moreover, actual values of these factors may be different than build plan. The factors could be static factors and/or dynamic factors. Static factors are largely constant for the entire build, such as powder size distribution (PSD), powder morphology, and/or the like, including combinations thereof. Dynamic factors can change for layers during the build, such as moisture content, laser power, scan speed, gas flow, and/or the like, including combinations thereof.

Figure 5A:
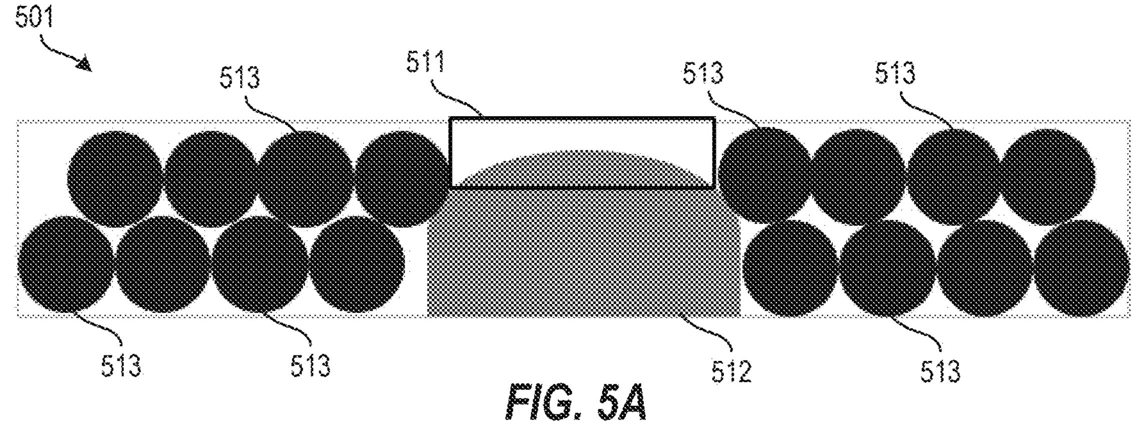
FIGS. 5A and 5B depict schematics of a spreading simulation are shown according to one or more embodiments described herein.
Figure 5B:
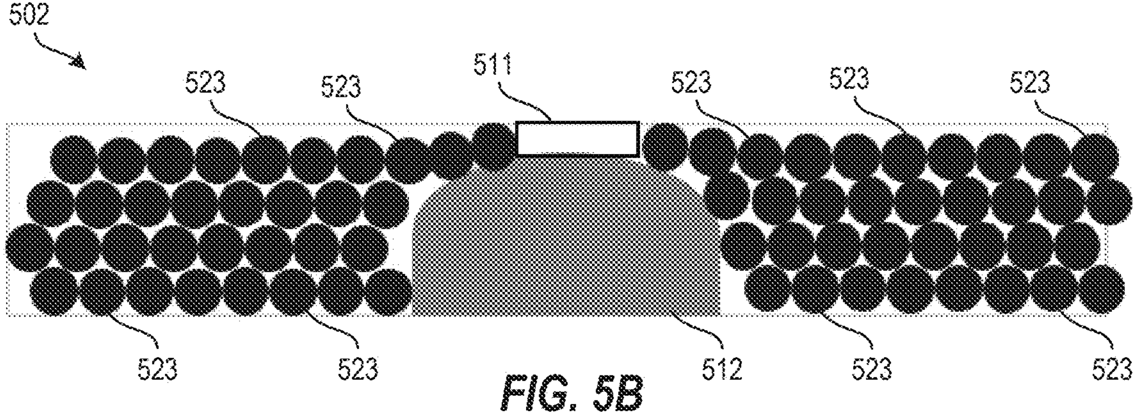

Turning now to FIGS. 5A and 5B, schematics 501, 502 of a spreading simulation are shown according to one or more embodiments described herein. Factors such as PSD, powder morphology, chamber conditions, re-coater type, re-coater speed, damage on the re-coater, layer thickness, the geometry after deformation, and/or the like including combinations thereof could affect spreading behavior of the powder during the build. The build simulation engine 116 can perform a spreading simulation that models powder spreading on deformed geometry considering one or more of these factors. The spreading simulation generates predicted exposed regions and/or re-coater interference, for example. The schematic 501 of FIG. 5A shows an exposed region 511 of the deformed part 512 for large sized particles 513. The schematic 502 of FIG. 5B shows the exposed region 511 of the deformed part 512 for large sized particles 523. As can be seen by comparing these two schematics, it can be observed that that the same amount of curling could lead to significantly different amount of exposed regions depending on the particle size distribution. Similarly, for same powder size, different geometries could lead to non-proportionally different amount of exposed regions (not shown in figures). Spreading simulations account of such factors.

Figure 6:
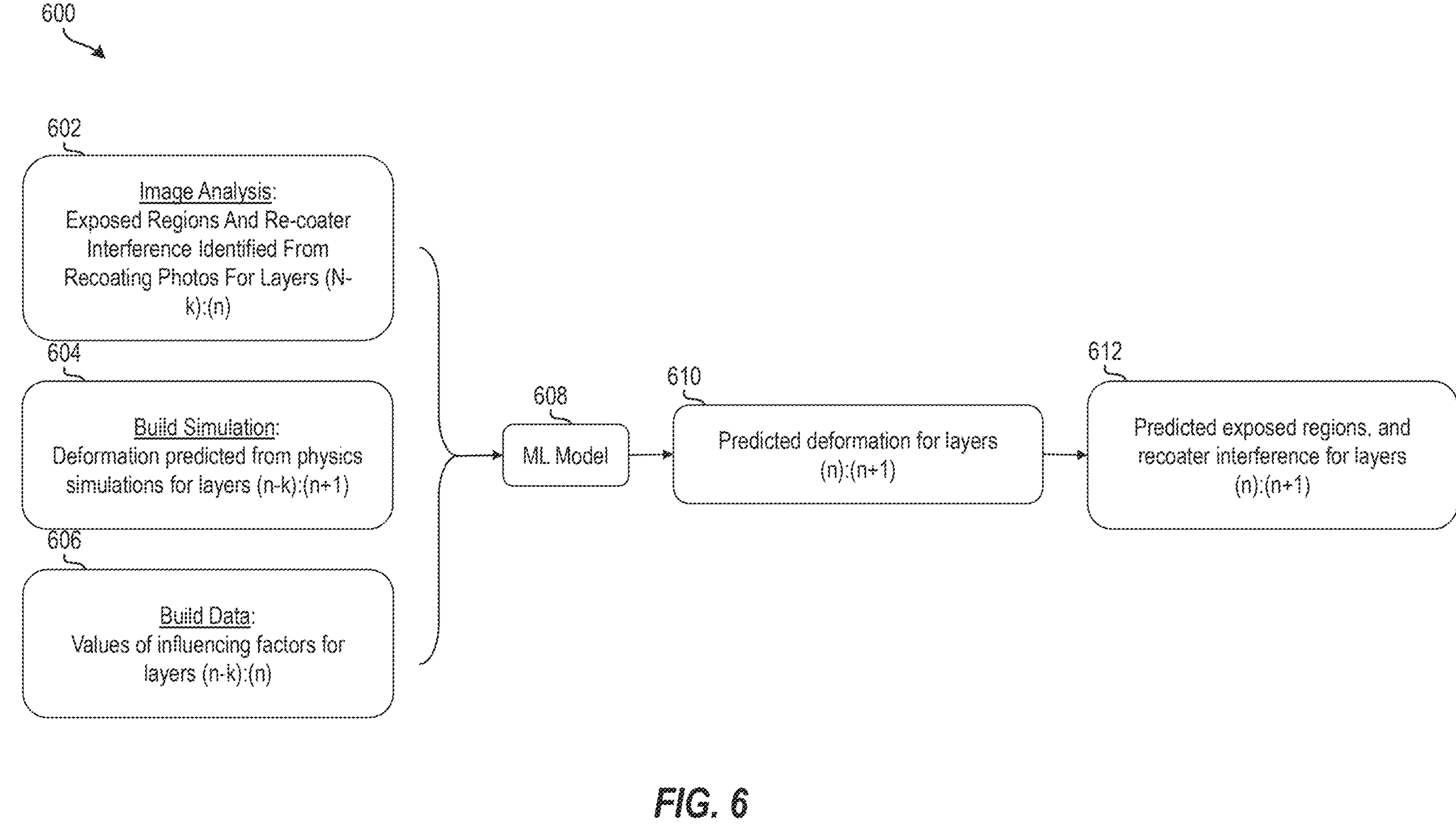
FIG. 6 depicts a flow diagram of a method for distortion prediction for additive manufacturing using image analysis according to one or more embodiments described herein.
Figure 7:
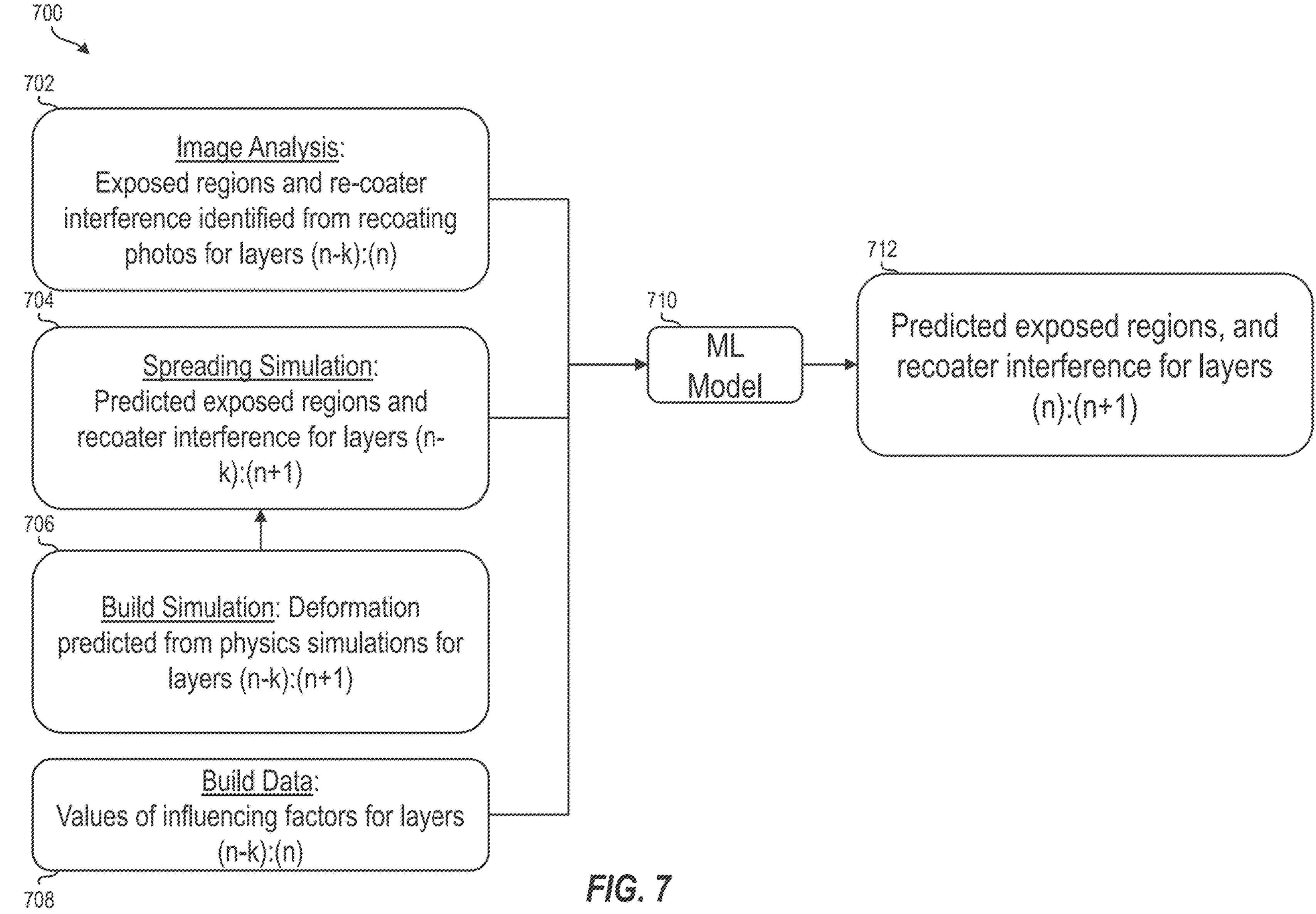
FIG. 7 depicts a flow diagram of a method for distortion prediction for additive manufacturing using image analysis according to one or more embodiments described herein.

FIGS. 6 and 7 are now described, which provide methods for distortion prediction for additive manufacturing using image analysis according to one or more embodiments described herein. Particularly, FIG. 6 depicts a flow diagram of a method 600 for distortion prediction for additive manufacturing using image analysis according to one or more embodiments described herein. The method 600 can be implemented using any suitable system and/or device. For example, the method 600 can be implemented using the processing system 100 of FIG. 1, the processing system 900 of FIG. 9, and/or the like, including combinations and/or multiples thereof.

The method 600 uses image analysis (block 602), build simulation (block 604), and build data (block 606) as input to a trained machine learning model (block 608). The variable "n" is the current layer number, (n+1) is the next layer to be printed, and k is a number of previous layers that are accounted for in the model (e.g., one or more prediction can depend on previous k layers). According to one or more embodiments described herein, the build simulation (block 604) is conducted before the build begins, so the results are available for each of the layers. The trained machine learning model (block 608) makes one or more predictions of deformation (block 610) for the current layer "n" and/or a next layer "n+1", for example. Based on the predicted deformation(s), suitable criteria or calculations may be used to predict exposed regions and re-coater interference (block 612) for the current layer "n" and/or the next layer "n+1". The influencing factors can include one or more of PSD, layer thickness, meltdown effect, and/or the like, including combinations thereof. When predicting re-coater interference, the severity of the projected re-coater interference and/or a location of the re-coater interference can also be predicted.

Additional processes also may be included, and it should be understood that the processes depicted in FIG. 6 represent illustrations, and that other processes may be added or existing processes may be removed, modified, or rearranged without departing from the scope of the present disclosure.

FIG. 7 depicts a flow diagram of a method for distortion prediction for additive manufacturing using image analysis according to one or more embodiments described herein. The method 700 can be implemented using any suitable system and/or device. For example, the method 700 can be implemented using the processing system 100 of FIG. 1, the processing system 900 of FIG. 9, and/or the like, including combinations and/or multiples thereof.

The method 700 uses image analysis (block 702), a spreading simulation (block 704), and build data (block 708) as input to a trained machine learning model (block 710). The spreading simulation (block 704) uses deformations predicted by the build simulation (block 708) as an input and outputs predicted exposed regions and/or re-coater interference. The trained machine learning model (block 710) makes predictions of exposed regions and re-coater interference for the current layer "n" and/or the next layer "n+1" (block 712).

Additional processes also may be included, and it should be understood that the processes depicted in FIG. 7 represent illustrations, and that other processes may be added or existing processes may be removed, modified, or rearranged without departing from the scope of the present disclosure.

Figure 8:
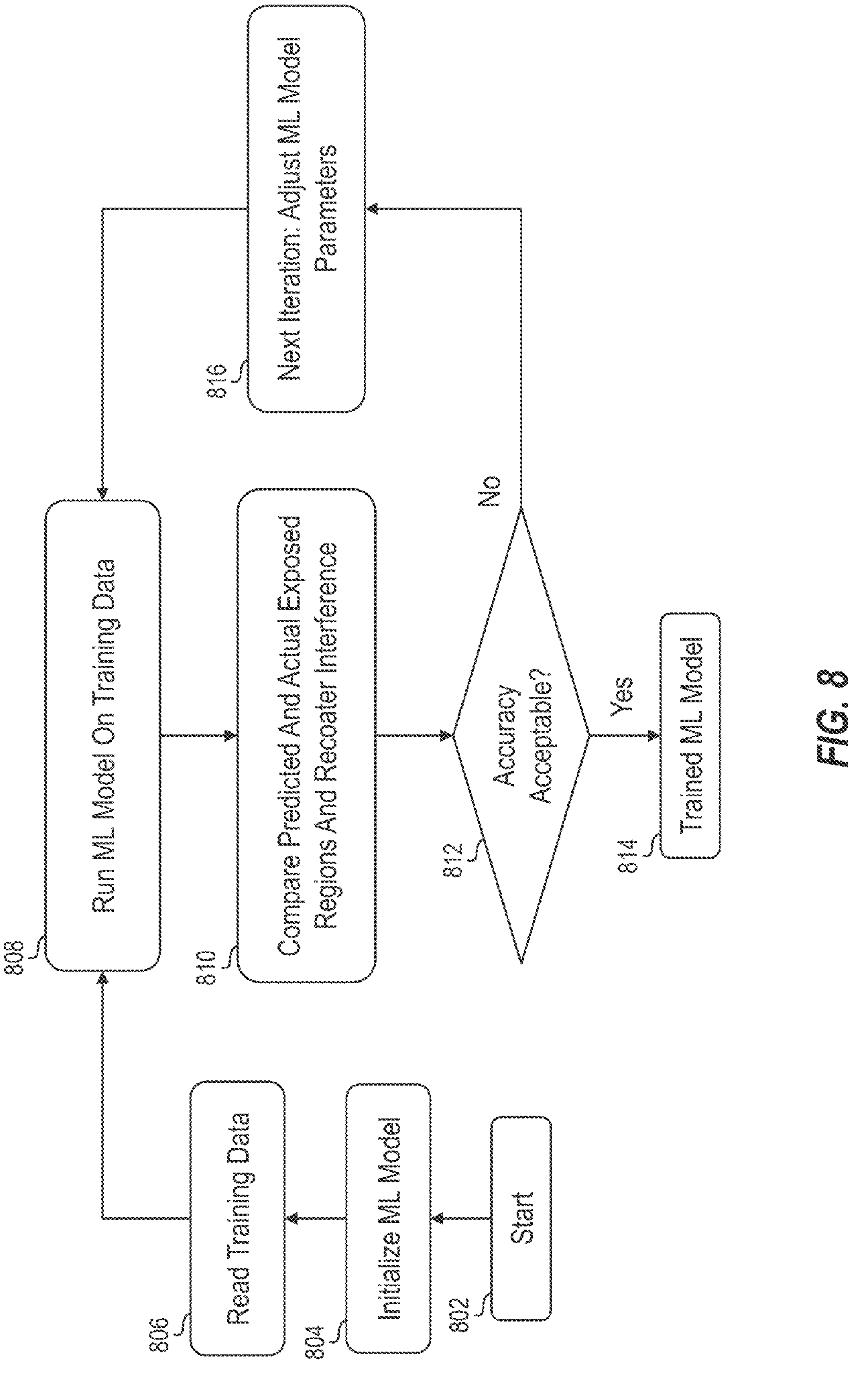
FIG. 8 depicts a flow diagram of a method for training a machine learning model according to one or more embodiments described herein.

FIG. 8 depicts a flow diagram of a method 800 for training a machine learning model according to one or more embodiments described herein. The method 800 can be implemented using any suitable system and/or device. For example, the method 800 can be implemented using the processing system 100 of FIG. 1, the processing system 900 of FIG. 9, and/or the like, including combinations and/or multiples thereof.

At block 802, the method 800 starts. At block 804, an untrained machine learning model is initialized. At block 806, training data (e.g., training data 120) are received (such as from another system or device), are collected (such as using the sensor 106), and/or are read (such as from the data store 108). An example of the training data include past builds from additive manufacturing systems, where (i) no regions were exposed, (ii) regions were exposed but re-coater interference did not occur, and (iii) exposed regions that led to re-coater interference. Since the builds are from the past, the "ground truth" (e.g., the actual exposed regions and interference in block 810) is known for the next layer (layer "n+1") from the image. The predictions from block 808 (see, e.g., block 612 and/or block 712 of FIGS. 6 and 7 respectively) are compared with this ground truth. Increasing the number of past builds representing various situations in the training data increases fidelity of the trained machine learning model.

At block 808, the processing system 100, using the ML model training engine 110, begins training by running the machine learning model on the training data. The ML model training engine 110 generates a prediction of an exposed region and/or a re-coater interference. At block 810, the prediction(s) generated at block 808 is compared to an actual exposed region and/or an actual re-coater blade interference of a re-coater blade of an additive manufacturing system. That is, at block 810, the ML model training engine 110 compares at least one of the predicted exposed region and the predicted re-coater interference with an actual exposed region or an actual predicted re-coater interference.

At decision block 812, the ML model training engine 110 determines whether the accuracy of the prediction from block 808 is acceptable based on the comparison at block 810. For example, if the prediction is within a threshold deviation of the actual exposed regions and re-coater blade interference (e.g., within 10%, within 5%, within 2.5%, within 2%, within 1%, within 0.1%, etc.), then the prediction is considered to be acceptable. In such cases, the method 800 proceeds to block 814, and the trained ML model is generated, saved, and/or output so that it can be used for inference, as described herein. However, if at decision block 812 it is determined that the accuracy of the prediction from block 808 is not acceptable, the method 800 proceeds to block 816, where ML model parameters are adjusted for a next iteration. Examples of such ML model parameters include weights of one or more layers (e.g., hidden layer(s), output layer, etc., including combinations thereof) of the machine learning model. Training (e.g., blocks 808, 810, 812, 814) can be iterated one or more times until the ML model is trained.

Additional processes also may be included, and it should be understood that the processes depicted in FIG. 8 represent illustrations, and that other processes may be added or existing processes may be removed, modified, or rearranged without departing from the scope of the present disclosure.

Figure 9:
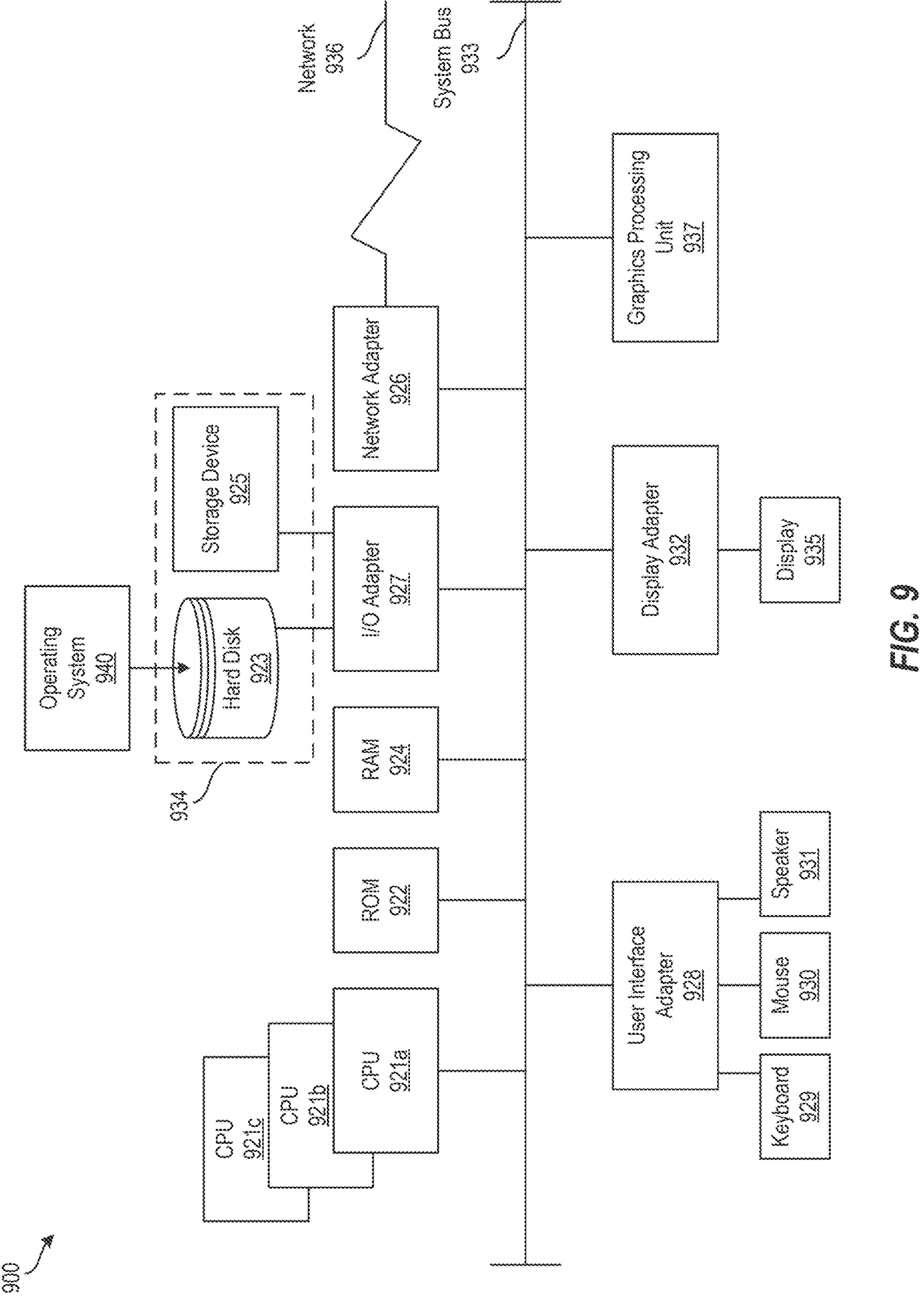
FIG. 9 depicts a block diagram of a processing system for implementing the presently described techniques according to one or more embodiments described herein.

It is understood that one or more embodiments described herein is capable of being implemented in conjunction with any other type of computing environment now known or later developed. For example, FIG. 9 depicts a block diagram of a processing system 900 for implementing the techniques described herein. In accordance with one or more embodiments described herein, the processing system 900 is an example of a cloud computing node of a cloud computing environment. In examples, processing system 900 has one or more central processing units ("processors" or "processing resources" or "processing devices") 921*a*, 921*b*, 921*c*, etc. (collectively or generically referred to as processor(s) 921 and/or as processing device(s)). In aspects of the present disclosure, each processor 921 can include a reduced instruction set computer (RISC) microprocessor. Processors 921 are coupled to system memory (e.g., random access memory (RAM) 924) and various other components via a system bus 933. Read only memory (ROM) 922 is coupled to system bus 933 and may include a basic input/output system (BIOS), which controls certain basic functions of processing system 900.

Further depicted are an input/output (I/O) adapter 927 and a network adapter 926 coupled to system bus 933. I/O adapter 927 may be a small computer system interface (SCSI) adapter that communicates with a hard disk 923 and/or a storage device 925 or any other similar component. I/O adapter 927, hard disk 923, and storage device 925 are collectively referred to herein as mass storage 934. Operating system 940 for execution on processing system 900 may be stored in mass storage 934. The network adapter 926 interconnects system bus 933 with an outside network 936 enabling processing system 900 to communicate with other such systems.

A display 935 (e.g., a display monitor) is connected to system bus 933 by display adapter 932, which may include a graphics adapter to improve the performance of graphics intensive applications and a video controller. In one aspect of the present disclosure, adapters 926, 927, and/or 932 may be connected to one or more I/O busses that are connected to system bus 933 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 933 via user interface adapter 928 and display adapter 932. A keyboard 929, mouse 930, and speaker 931 may be interconnected to system bus 933 via user interface adapter 928, which may include, for example, a Super I/O chip integrating multiple device adapters into a single integrated circuit.

In some aspects of the present disclosure, processing system 900 includes a graphics processing unit 937. Graphics processing unit 937 is a specialized electronic circuit designed to manipulate and alter memory to accelerate the creation of images in a frame buffer intended for output to a display. In general, graphics processing unit 937 is very efficient at manipulating computer graphics and image processing, and has a highly parallel structure that makes it more effective than general-purpose CPUs for algorithms where processing of large blocks of data is done in parallel.

Thus, as configured herein, processing system 900 includes processing capability in the form of processors 921, storage capability including system memory (e.g., RAM 924), and mass storage 934, input means such as keyboard 929 and mouse 930, and output capability including speaker 931 and display 935. In some aspects of the present disclosure, a portion of system memory (e.g., RAM 924) and mass storage 934 collectively store the operating system 940 to coordinate the functions of the various components shown in processing system 900.

Set forth below are some embodiments of the foregoing disclosure:

Embodiment 1: A method includes: performing an image analysis on an image of a layer of an object being manufactured by an additive manufacturing system to identify an exposed surface in the image of the layer; performing a build simulation to generate a simulated distortion for the layer; evaluating build data to determining a value of an influencing factor for the layer; predicting at least one of a predicted distortion or a predicted re-coater interference for a next layer, using a machine learning model, based at least in part on the image analysis, the build simulation, and the build data; and implementing an action, based at least in part on the at least one of the predicted distortion or the predicted re-coater interference, to alter fabrication of the next layer.

Embodiment 2: A method according to any prior embodiment, further including performing a spreading simulation.

Embodiment 3: A method according to any prior embodiment, wherein predicting the predicted distortion for the next layer is further based at least in part on a result of the spreading simulation.

Embodiment 4: A method according to any prior embodiment, wherein the spreading simulation models powder spreading on the layer based at least in part on at least one factor, wherein the at least one factor is selected from a group consisting of a powder size distribution, a powder morphology, a chamber condition, a re-coater type, a re-coater speed, damage on a re-coater, a layer thickness, and a geometry after deformation.

Embodiment 5: A method according to any prior embodiment, wherein predicting the predicted re-coater interference comprises predicting a severity of the predicted re-coater interference and a location of the predicted re-coater interference.

Embodiment 6: A method according to any prior embodiment, wherein the machine learning model is a recurrent neural network.

Embodiment 7: A method according to any prior embodiment, further comprising training the machine learning model.

Embodiment 8: A method according to any prior embodiment, wherein training the machine learning model comprises inputting training data into the machine learning model to generate at least one of a predicted exposed region or a predicted re-coater interference.

Embodiment 9: A method according to any prior embodiment, wherein training the machine learning model further comprises comparing the at least one of the predicted exposed region and the predicted re-coater interference with an actual exposed region or an actual predicted re-coater interference.

Embodiment 10: A method according to any prior embodiment, wherein training the machine learning model further comprises, responsive to determining that an accuracy of the comparison is acceptable, generating a trained machine learning model.

Embodiment 11: A method according to any prior embodiment, wherein training the machine learning model further comprises, responsive to determining that an accuracy of the comparison is unacceptable, performing at least one additional training iteration, wherein at least one machine learning model parameter is adjusted during each iteration.

Embodiment 12: A processing system comprising a memory and a processor, the processing system for executing computer readable instructions, the computer readable instructions controlling the processor to perform operations comprising: performing an image analysis on an image of a layer of an object being manufactured by an additive manufacturing system to identify an exposed surface in the image of the layer; performing a build simulation to generate a simulated distortion for the layer; comparing the exposed surface in the image of the layer with the simulated distortion for the layer; predicting distortion for a next layer using a machine learning model; and implementing an action, based at least in part on the predicted distortion, to reduce distortion during fabrication of the next layer.

Embodiment 13: A system according to any prior embodiment, wherein the machine learning model is a recurrent neural network.

Embodiment 14: A system according to any prior embodiment, further comprising the additive manufacturing system.

Embodiment 15: A system according to any prior embodiment, the instructions further comprising training the machine learning model, wherein training the machine learning model comprises inputting training data into the machine learning model to generate at least one of a predicted exposed region or a predicted re-coater interference.

Embodiment 16: A system according to any prior embodiment, wherein training the machine learning model further comprises comparing the at least one of the predicted exposed region and the predicted re-coater interference with an actual exposed region or an actual predicted re-coater interference.

Embodiment 17: A system according to any prior embodiment, wherein training the machine learning model further comprises, responsive to determining that an accuracy of the comparison is acceptable, generating a trained machine learning model.

Embodiment 18: A system according to any prior embodiment, wherein training the machine learning model further comprises, responsive to determining that an accuracy of the comparison is unacceptable, performing at least one additional training iteration, wherein at least one machine learning model parameter is adjusted during each iteration.

Embodiment 19: A system according to any prior embodiment, further comprising a camera, wherein the operations further comprise capturing the image of the layer of the object being manufactured by the additive manufacturing system during the manufacturing.

Embodiment 20: A system according to any prior embodiment, wherein implementing the action comprises at least one of altering a laser power of the additive manufacturing system or skipping manufacturing of at least a portion of the next layer.

The use of the terms “a” and “an” and “the” and similar referents in the context of describing the present disclosure (especially in the context of the following claims) are to be construed to cover both the singular and the plural, unless otherwise indicated herein or clearly contradicted by context. Further, it should further be noted that the terms “first,” “second,” and the like herein do not denote any order, quantity, or importance, but rather are used to distinguish one element from another. The modifier “about” used in connection with a quantity is inclusive of the stated value and has the meaning dictated by the context (e.g., it includes the degree of error associated with measurement of the particular quantity).

While the present disclosure has been described with reference to an exemplary embodiment or embodiments, it will be understood by those skilled in the art that various changes can be made and equivalents can be substituted for elements thereof without departing from the scope of the present disclosure. In addition, many modifications can be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims. Also, in the drawings and the description, there have been disclosed exemplary embodiments of the present disclosure and, although specific terms can have been employed, they are unless otherwise stated used in a generic and descriptive sense only and not for purposes of limitation, the scope of the present disclosure therefore not being so limited.

What is claimed is:

1. A method comprising:

performing an image analysis on an image of a current layer of an object being manufactured by an additive manufacturing system to identify an actual exposed surface in the image of the current layer;

performing a build simulation using build data to generate a simulated distortion for the current layer of the object, at least one previous layer of the object and a next layer of the object;

performing a spreading simulation to predict a simulated exposed surface at the current layer from the simulated distortion, wherein the spreading simulation models a spreading of powder on the current layer based on a damage caused to a re-coater during application of the at least one previous layer;

evaluating the build data to determine a value of an influencing factor of the build data affecting the actual exposed surface for the current layer;

predicting, using a recurrent neural network, a reduction of the actual exposed surface within the next layer based on the image of the current layer and the simulated exposed surface at the current layer for which a re-coater interference does not occur in the next layer; and implementing an action to continue fabrication of the next layer based at least in part on the predicted reduction.

2. The method of claim 1, wherein predicting the predicted distortion for the next layer is further based at least in part on a result of the spreading simulation.

3. The method of claim 1, wherein the spreading simulation models powder spreading on the layer further based on at least one selected from a group consisting of a chamber condition, a re-coater type, a re-coater speed, or a layer thickness.

4. The method of claim 1, further comprising training the recurrent neural network.

5. The method of claim 4, wherein training the recurrent neural network comprises inputting training data into the recurrent neural network to predict a re-coater interference in the current layer.

6. The method of claim 5, wherein training the recurrent neural network further comprises comparing the predicted re-coater interference in the current layer with an actual re-coater interference in the current layer.

7. The method of claim 6, wherein training the recurrent neural network further comprises, responsive to determining that an accuracy of the comparison is acceptable, generating a trained recurrent neural network.

8. The method of claim 6, wherein training the recurrent neural network further comprises, responsive to determining that an accuracy of the comparison is unacceptable, performing at least one additional training iteration, wherein at least one recurrent neural network parameter is adjusted during each iteration.

9. A system comprising:

a processing system comprising a memory and a processing device, the processing system for executing computer readable instructions, the computer readable instructions controlling the processing device to perform operations comprising:

performing an image analysis on an image of a current layer of an object being manufactured by an additive manufacturing system to identify an actual exposed surface in the image of the current layer;

performing a build simulation using build data to generate a simulated distortion for the current layer of the object, at least one previous layer of the object and a next layer of the object;

performing a spreading simulation to predict a simulated exposed surface at the current layer from the simulated distortion, wherein the spreading simulation models a spreading of powder on the current layer based on a damage caused to a re-coater during application of the at least one previous layer;

evaluating the build data to determine a value of an influencing factor of the build data affecting the actual exposed surface for the current layer;

predicting, using a recurrent neural network, a reduction of the actual exposed surface within the next layer based on the image of the current layer and the simulated exposed surface at the current layer for which a re-coater interference does not occur in the next layer; and implementing an action to continue fabrication of the next layer based at least in part on the predicted reduction.

10. The system of claim 9, further comprising the additive manufacturing system.

11. The system of claim 10, the instructions further comprising training the recurrent neural network, wherein training the recurrent neural network comprises inputting training data into the recurrent neural network to generate the predicted re-coater interference.

12. The system of claim 11, wherein training the recurrent neural network further comprises comparing the at least one of the predicted exposed region and the predicted re-coater interference with an actual exposed region.

13. The system of claim 12, wherein training the recurrent neural network further comprises, responsive to determining that an accuracy of the comparison is acceptable, generating a trained recurrent neural network.

14. The system of claim 12, wherein training the recurrent neural network further comprises, responsive to determining that an accuracy of the comparison is unacceptable, performing at least one additional training iteration, wherein at least one machine learning model parameter is adjusted during each iteration.

15. The system of claim 9, further comprising a camera, wherein the operations further comprise capturing the image of the layer of the object being manufactured by the additive manufacturing system during the manufacturing.

16. The system of claim 9, wherein implementing the action comprises at least one of altering a laser power of the additive manufacturing system or skipping manufacturing of at least a portion of the next layer.

* * * * *